US012731597B2

(12) United States Patent
Chae

(10) Patent No.: US 12,731,597 B2
(45) Date of Patent: Sep. 8, 2026

(54) METHOD AND SYSTEM FOR CONSTRUCTING LEARNING DATABASE USING VOICE PERSONAL INFORMATION PROTECTION TECHNOLOGY

(71) Applicant: AIMATICS CO.,LTD, Seoul (KR)

(72) Inventor: Jeong Hun Chae, Seongnam-si (KR)

(73) Assignee: AIMATICS CO., LTD, Seoul (KR)

( * ) Notice: Subject to any disclaimer, the term of this patent is extended or adjusted under 35 U.S.C. 154(b) by 241 days.

(21) Appl. No.: 18/406,525

(22) Filed: Jan. 8, 2024

(65) Prior Publication Data

US 2024/0221767 A1 Jul. 4, 2024

Related U.S. Application Data

(63) Continuation of application No. PCT/KR2022/009153, filed on Jun. 27, 2022.

(30) Foreign Application Priority Data

Jul. 9, 2021 (KR) ........................ 10-2021-0090494

(51) Int. Cl.
*G10L 21/02* (2013.01)

(52) U.S. Cl.
CPC .................................... *G10L 21/02* (2013.01)

(58) Field of Classification Search
None
See application file for complete search history.

(56) References Cited

U.S. PATENT DOCUMENTS

| | | | | |
|---|---|---|---|---|
| 11,120,199 | B1 * | 9/2021 | Bachtiger | G06F 40/284 |
| 11,366,930 | B1 * | 6/2022 | Jeong | G06N 3/094 |
| 2013/0218570 | A1 * | 8/2013 | Imoto | G11B 27/034 704/E21.001 |
| 2017/0256254 | A1 * | 9/2017 | Huang | G06N 3/096 |

(Continued)

FOREIGN PATENT DOCUMENTS

| | | | |
|---|---|---|---|
| JP | 2013-171089 | A | 9/2013 |
| JP | 2016-139261 | A | 8/2016 |

(Continued)

OTHER PUBLICATIONS

An Office Action; "Notice of Reasons for Refusal," mailed by the Japanese Patent Office on Mar. 11, 2025, which corresponds to Japanese Patent Application No. 2024-501205 and is related to U.S. Appl. No. 18/406,525.

(Continued)

*Primary Examiner* — Daniel C Washburn
*Assistant Examiner* — Tyler Becker
(74) *Attorney, Agent, or Firm* — Studebaker Brackett PLLC

(57) ABSTRACT

The present disclosure relates to a method and a system for constructing a learning database using a voice personal information protection technology, wherein the method comprises receiving video data including sound data; separating the sound data from the video data; extracting background sound data from the sound data; and storing the video data from which the sound data has been removed and the background sound data as learning data. Therefore, the present disclosure may secure data including sound information for which personal information is protected as learning data for machine learning.

4 Claims, 9 Drawing Sheets

(56) References Cited

U.S. PATENT DOCUMENTS

| | | | | | |
|---|---|---|---|---|---|
| 2018/0005626 | A1* | 1/2018 | Betley | G10L 15/063 | |
| 2019/0377901 | A1* | 12/2019 | Balzer | H04L 63/0421 | |
| 2022/0122628 | A1* | 4/2022 | McCloskey | G06N 3/0464 | |
| 2023/0040084 | A1* | 2/2023 | Cherukara | H04M 3/436 | |
| 2023/0103695 | A1* | 4/2023 | Streit | H04L 9/008 | 713/150 |
| 2023/0179596 | A1* | 6/2023 | Schonberger | H04L 63/10 | 726/4 |

FOREIGN PATENT DOCUMENTS

| | | | |
|---|---|---|---|
| JP | 2019-200671 | A | 11/2019 |
| KR | 10-1581641 | B1 | 12/2015 |
| KR | 10-2019-0100117 | A | 8/2019 |
| KR | 10-2089797 | B1 | 3/2020 |
| KR | 10-2021-0026006 | A | 3/2021 |
| KR | 10-2374343 | B1 | 3/2022 |
| WO | 2005/101346 | A1 | 10/2005 |
| WO | 2021/006405 | A1 | 1/2021 |

OTHER PUBLICATIONS

International Search Report issued in PCT/KR2022/009153; mailed Sep. 23, 2022.

Written Opinion of the International Searching Authority issued in PCT/KR2022/009153; mailed Sep. 23, 2022.

* cited by examiner

METHOD AND SYSTEM FOR CONSTRUCTING LEARNING DATABASE USING VOICE PERSONAL INFORMATION PROTECTION TECHNOLOGY

CROSS-REFERENCE TO RELATED APPLICATIONS

This application is a Continuation of International Application No. PCT/KR2022/009153 filed Jun. 27, 2022, which claims benefit of priority to Korean Patent Application No. 10-2021-0090494 filed Jul. 9, 2021, the entire contents of which are incorporated herein by reference.

TECHNICAL FIELD

The present disclosure relates to a technology for generating learning data for machine learning and, more specifically, to a method and a system for constructing a learning database for machine learning using a voice personal information protection technology capable of securing data that includes sound information for which personal information is protected.

BACKGROUND ART

Machine learning methods are divided into three broad categories comprising supervised learning, unsupervised learning, and reinforcement learning. Supervised learning is a method of learning where correct answer data (a pair of input data and the corresponding labeled answer) already exists, and learning is carried out to minimize the error between the predicted value of a learning model and its correct answer by informing the learning model of the correct answer. Unsupervised learning is a method of learning where correct answer data does not exist (only input data is provided), and learning is carried out by analyzing similarities among data, discovering hidden characteristics within the data, and classifying the data based on the analysis. Reinforcement learning is a method of learning where correct answer data does not exist, and learning is carried out by providing rewards and penalties to the decision of a learning model within a dynamic environment.

Supervised learning has the advantage of being easier to perform learning, more stable, and simpler to evaluate the learning performance compared to unsupervised learning or reinforcement learning because unambiguous answer data is available. However, the preparation of training data demands a significant investigation of time and human resources, often constituting a substantial portion of the entire supervised learning process. Also, since the quantity and quality of training data exert a significant influence on the recognition performance of a trained machine learning model, the key factor to successful supervised learning may be attributed to the effective generation of training data.

Meanwhile, while the sound within a video contains a lot of valuable information, great care should be exercised when generating learning data from video information due to a high risk of privacy infringement. In other words, even with voice modulation, individual identification is still possible through intonation and tone of the voice; therefore, to utilize sound information including voice, the voice information needs to be processed to prevent individual identification.

In particular, recognition sensors, such as cameras, lidars, and radars, play an essential role in recognizing and evaluating the driving situation of a vehicle. In a machine learning approach, data collected from these recognition sensors may be used to train a machine learning model. The greater the amount of information contained in the data collected from the sensors, the more advantageous it is to improve the performance of a target machine learning model; therefore, by adding sound information inside and outside the vehicle unrelated to cameras, lidars, and radars as machine learning data, performance improvement of the machine learning model may be expected.

However, since voice information included within sound data is sensitive and may lead to the identification of individuals, it is not desirable to store and use the voice information without the consent from individuals involved. Methods used to protect individual privacy include voice modulation; however, even with voice modulation, individuals may be identified to some extent by the intonation and tone of the individuals' voices; therefore, to utilize sound information including voice, it is necessary to process voice information to prevent the identification of individuals.

PRIOR ART DOCUMENT

Patent Document

Korean Patent No. 10-1581641 (2015 Dec. 23)

DETAILED DESCRIPTION OF INVENTION

Technical Problems

According to one embodiment of the present disclosure, the present disclosure provides a method and a system for constructing a learning database for machine learning using a voice personal information protection technology capable of securing data that includes sound information for which personal information is protected.

According to one embodiment of the present disclosure, the present disclosure provides a method and a system for constructing a learning database using a voice personal information protection technology capable of separating voice data from the background sound within sound data, encrypting the voice data by applying irreversible encoding only to the voice data, transforming the voice data into corresponding text, and removing personal information from the voice data.

Technical Solution

Among embodiments, a method for constructing a learning database using a voice personal information protection technology comprises receiving video data including sound data; separating the sound data from the video data; extracting background sound data from the sound data; and storing the video data from which the sound data has been removed and the background sound data as learning data.

The separating of the sound data may include applying at least one of a plurality of preprocessing methods to the sound data.

The extracting of the background sound data may include defining a machine learning-based network model including a deep neural network; constructing a first network model receiving the sound data as input and generating voice data as output; constructing a second network model receiving the sound data as input and generating the background sound data as output; and separating the voice data and the background sound data from the sound data based on the first and second network models.

The extracting of the background sound data may include constructing a third network model receiving the voice data as input and generating a voice feature vector as output; performing irreversible encoding to the voice data based on the third network model; and storing the voice feature vector generated by the irreversible encoding as the learning data.

The extracting of the background sound data may include constructing a fourth network model receiving the sound data as input and generating text data as output; and extracting the text data from the voice data based on the fourth network model.

The extracting of the background sound data may include detecting personal information from the text data; transforming the personal data from the text data into anonymous data; and storing the text data including the anonymous information as the learning data.

The transforming of the personal data into the anonymous data may include replacing the personal information with a higher class name based on a machine learning-based transformation model.

Among embodiments, a system for constructing a learning database using a voice personal information protection technology comprises a video reception unit receiving video data including sound data; a sound extraction unit separating the sound data from the video data; a background sound separation unit extracting background sound data from the sound data; and a learning data storage unit storing the video data from which the sound data has been removed and the background sound data as learning data.

Effects of Invention

The disclosed technology can have the following effects. However, it is not intended to mean that a specific embodiment should include all of the following effects or only the following effects, and the scope of the disclosed technology should not be understood as being limited thereby.

A method and a system for constructing a learning database using a voice personal information protection technology according to one embodiment of the present disclosure may secure data including sound information for which personal information is protected as learning data for machine learning.

A method and a system for constructing a learning database using a voice personal information protection technology according to one embodiment of the present disclosure may separate voice data from the background sound within sound data, encrypting the voice data by applying irreversible encoding only to the voice data, transforming the voice data into corresponding text, and removing personal information from the voice data.

BEST MODE FOR CARRYING OUT THE INVENTION

Figure 1:
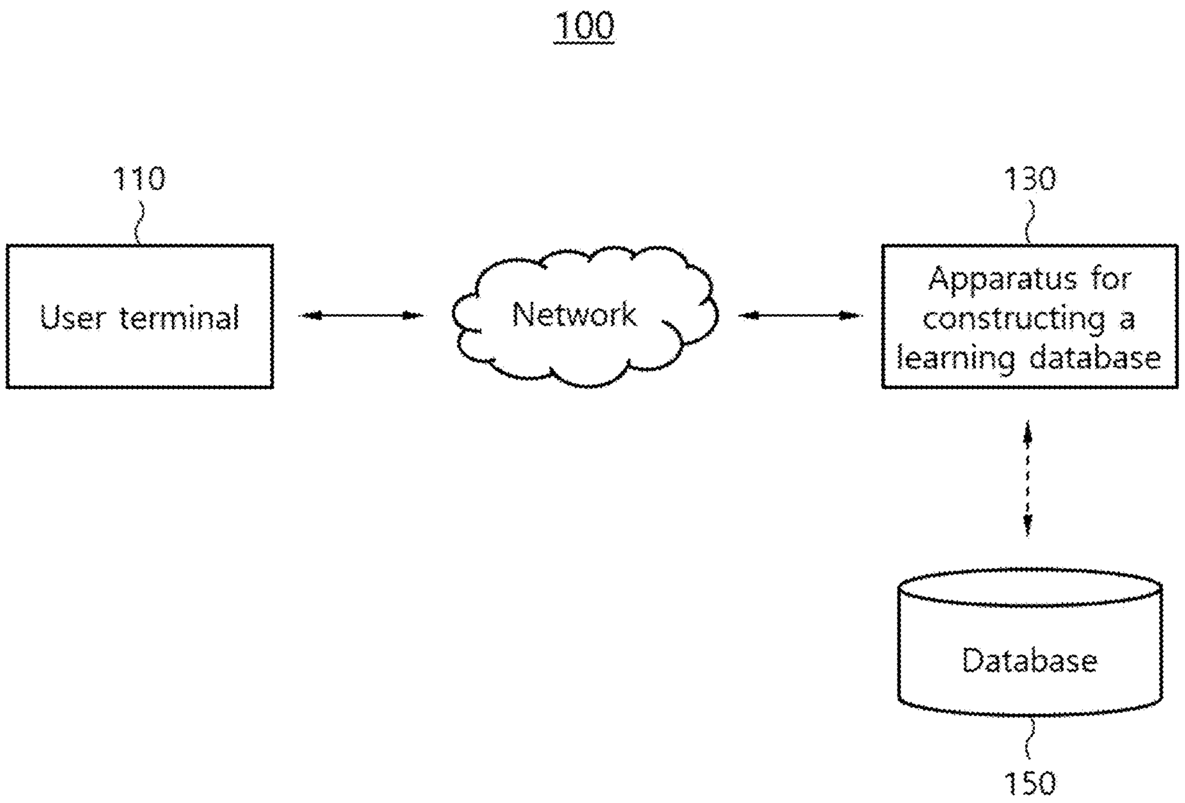
FIG. 1 illustrates a system for constructing a learning database according to the present disclosure.

The description of the present disclosure is only an example for structural or functional explanation, and the scope of the present disclosure should not be construed as limited by the embodiments described herein. In other words, the embodiments can be modified in various ways and can have various forms, and the scope of the present disclosure should be understood to include equivalents that can realize the technical idea. In addition, the purpose or effect presented in the present disclosure does not mean that a specific embodiment should include all or only such effects, so the scope of the present disclosure should not be understood as limited thereby.

Meanwhile, the meaning of the terms described in the present specification should be understood as follows.

The terms such as "first", "second", etc. are intended to distinguish one component from another component, and the scope of the present disclosure should not be limited by these terms. For example, a first component may be named as a second component, and similarly, the second component may also be named as the first component.

When it is described that a component is "connected" to another component, it should be understood that one component may be directly connected to another component, but that other components may also exist between them. On the other hand, when it is described that a component is "directly connected" to another component, it should be understood that there is no other component between them. Meanwhile, other expressions that describe the relationship between components, such as "between" and "immediately between" or "neighboring" and "directly neighboring" should be interpreted similarly.

Singular expressions should be understood to include plural expressions unless the context clearly indicates otherwise, and terms such as "comprise or include" or "have" are intended to specify the existence of implemented features, numbers, steps, operations, components, parts, or combinations thereof, but should be understood as not precluding the possibility of the existence or addition of one or more other features, numbers, steps, operations, components, parts, or combinations thereof.

Identification symbols (e.g., a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices that store data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 illustrates a system for constructing a learning database according to the present disclosure.

Referring to FIG. 1, a system 100 for constructing a learning database may be implemented by including a user terminal 110, an apparatus for constructing a learning database 130, and a database 150.

The user terminal 110 may corresponding to a terminal device operated by a user. According to an embodiment of the present disclosure, a user may be understood as one or more users, and a plurality of users may be divided into one or more user groups. Each of the one or more users may correspond to one or more user terminals 110. In other words, a first user may correspond to a first user terminal, a second user to a second user terminal, . . . , and an n-th user (where the n is a natural number) to an n-th user terminal.

Also, the user terminal 110 may correspond to a computing device, as one apparatus constituting the system 100 for constructing a learning database, capable of executing a user operation such as generation, modification, and deletion of learning data. For example, the user terminal 110 may be implemented as a smartphone, a laptop, or a computer, which may be operated by being connected to the apparatus 130 for constructing a learning database; however, the present disclosure is not necessarily limited to the specific examples, and the user terminal 110 may also be implemented in various other forms, including a tablet PC.

Also, the user terminal 110 may install and execute a dedicated program or application for the operation in conjunction with the apparatus 130 for constructing a learning database. For example, the user terminal 110 may transmit predetermined video data to the apparatus 130 for constructing a learning database to generate learning data and may access the learning database constructed by the apparatus 130 for constructing a learning database. The process above may be carried out through an interface provided by the dedicated program or application.

Meanwhile, the user terminal 110 may be connected to the apparatus 130 for constructing a learning database through a network, and a plurality of user terminal 110 may be simultaneously connected to the apparatus 130 for constructing a learning database.

The apparatus 130 for constructing a learning database may be implemented in the form of a server corresponding to a computer or a program executing the method for constructing a learning database according to the present disclosure. Also, the apparatus 130 for constructing a learning database may be connected to the user terminal 110 through a wired network or a wireless network such as the Bluetooth, WiFi, and LTE network and may transmit and receive data to and from the user terminal 110 through the network.

Also, the apparatus 130 for constructing a learning database may be implemented to operate by being connected to an independent external system (not shown in FIG. 1) to collect or provide learning data. In one embodiment, the apparatus 130 for constructing a learning database may be implemented in the form of a cloud server and satisfy various needs of users related to the construction and utilization of a learning database through a cloud service.

The database 150 may correspond to a storage device that stores various information required during the operation of the apparatus 130 for constructing a learning database. For example, the database 150 may store video data collected from various sources or store information related to learning algorithms and learning models for building a machine learning model; however, the present disclosure is not necessarily limited to the description above, and the apparatus 130 for constructing a learning database may store information collected or processed in various forms while performing a method for constructing a learning database using a voice personal information protection technology according to the present disclosure.

Also, FIG. 1 illustrates the database 150 as a device independent of the apparatus 130 for constructing a learning database; however, the present disclosure is not necessarily limited to the illustration, and the database 150 may be implemented by being included in the apparatus 130 for constructing a learning database as a logical storage device.

Figure 2:
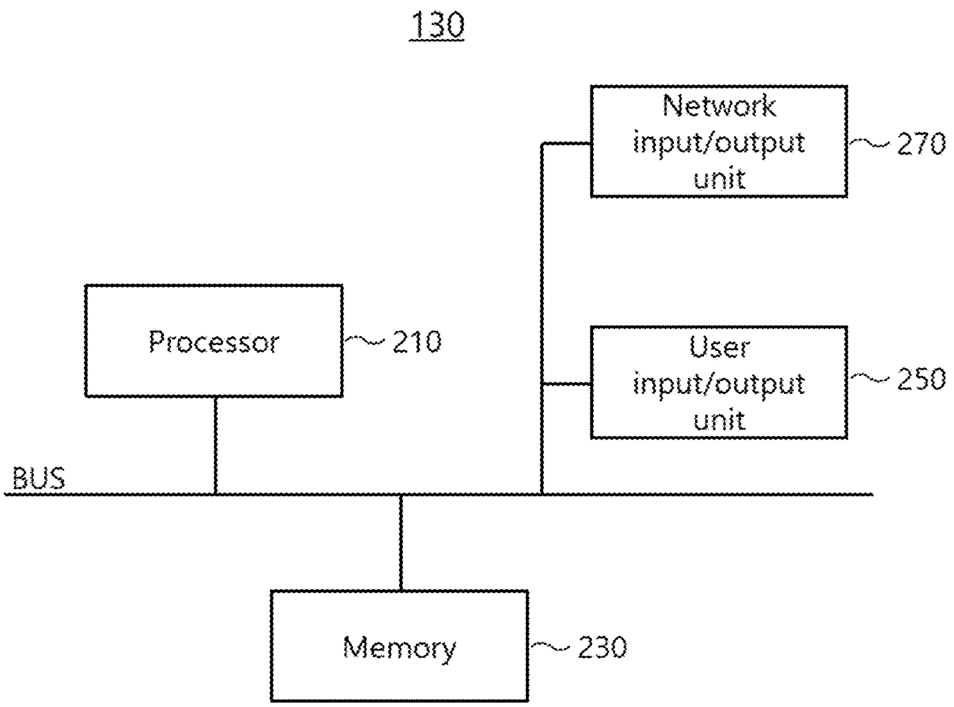
FIG. 2 illustrates a system structure of the apparatus for constructing a learning database of FIG. 1.

FIG. 2 illustrates a system structure of the apparatus for constructing a learning database of FIG. 1.

Referring to FIG. 2, the apparatus 130 for constructing a learning database may comprise a processor 210, a memory 230, a user input/output unit 250, and a network input/output unit 270.

The processor 210 may execute a procedure for constructing a learning database according to an embodiment of the present disclosure, manage the memory 230 read or written during the procedure, and schedule the synchronization timing between volatile and non-volatile memories. The processor 210 may control the overall operation of the apparatus 130 for constructing a learning database and may be electrically connected to the memory 230, the user input/output unit 250, and the network input/output unit 270 to control the data flow between them. The processor 210 may be implemented as a Central Processing Unit (CPU) of the apparatus 130 for constructing a learning database.

The memory 230 may be implemented using a non-volatile memory such as a solid state disk (SSD) or a hard disk drive (HDD), include an auxiliary memory device used to store the overall data required for the apparatus 130 for constructing a learning database, and include a main memory device implemented using a volatile memory such as a Random Access Memory (RAM). Also, the memory 230 may store a set of instructions for executing the method for constructing a learning database according to the present disclosure by being executed by processor 210 electrically connected to the memory 230.

The user input/output unit 250 may include an environment for receiving user input and an environment for outputting specific information to the user; for example, the user input/output unit 250 may include an input device including an adaptor such as a touch pad, a touch screen, an on-screen keyboard, or a pointing device and an output device including an adaptor such as a monitor or a touch screen. In one embodiment, the user input/output unit 250 may correspond to a computing device connected through a remote connection, and in such cases, the apparatus 130 for constructing a learning database may operate as an independent server.

The network input/output unit 270 may provide a communication environment for connecting to the user terminal 110 through a network and include an adaptor for communication through, for example, a Local Area Network (LAN), a Metropolitan Area Network (MAN), a Wide Area Network (WAN), and a Value Added Network (VAN). Also, the network input/output unit 270 may be implemented to provide a short-range communication function through WiFi or Bluetooth networks or a wireless communication function involving 4G or higher communication specifications for wireless transmission of learning data.

Figure 3:
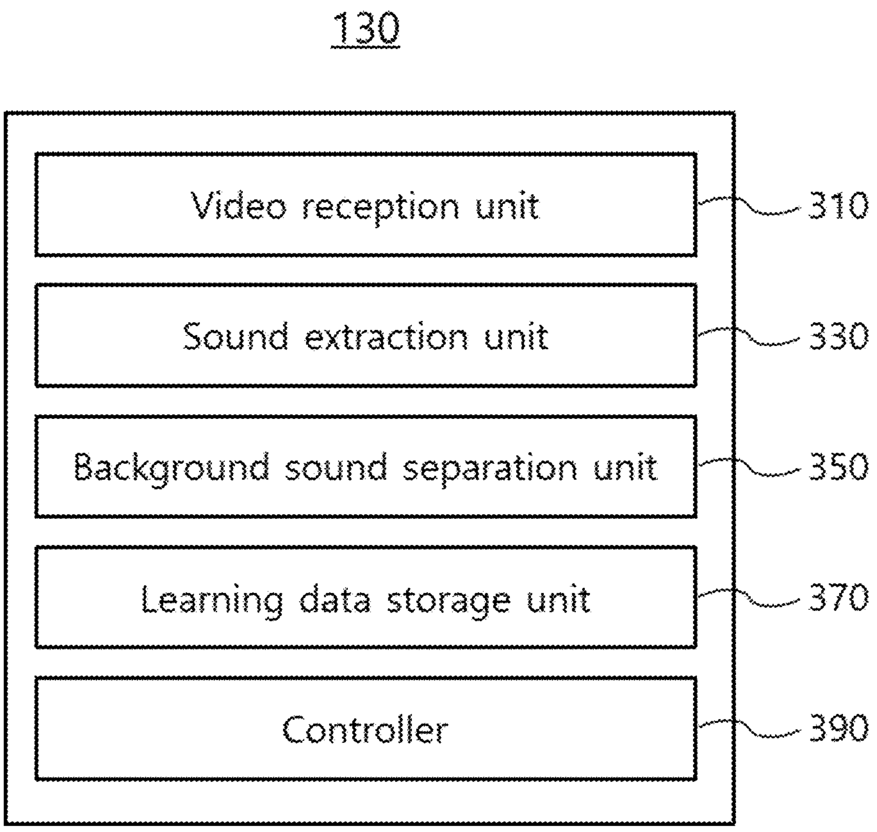
FIG. 3 illustrates a functional structure of the apparatus for constructing a learning database of FIG. 1.

FIG. 3 illustrates a functional structure of the apparatus for constructing a learning database of FIG. 1.

Referring to FIG. 3, the apparatus 130 for constructing a learning database may comprise a video reception unit 310, a sound extraction unit 330, a background sound separation unit 350, a learning data storage unit 370, and a controller 390.

The video reception unit 310 may receive video data including sound data. For example, video data may include black box videos captured through a black box while the vehicle is driving; images captured through recognition sensors such as cameras, lidars, and radars; aerial images; and medical images. Sound data included in the video data may include a background sound, white noise, and a voice. The video reception unit 310 may receive video data through a network, receive a video transmitted by the user terminal 110, or receive a video by searching videos stored in the database 150.

Also, the video reception unit 310 may independently receive sound data and video data. In other words, the video reception unit 310 may sequentially receive video data without sound and the corresponding sound data or may receive a pair of video and sound data.

In one embodiment, the video reception unit 310 may perform a preprocessing operation on the received video data. For example, the video reception unit 310 may perform preprocessing operations such as dividing video data by a predetermined section length or converting the resolution of the video data to a predetermined resolution. Also, the video reception unit 310 may generate a single image by integrating the original image and the preprocessed image. The video reception unit 310 may process the video data into a form that may be used at a later stage through various preprocessing operations, and the video received or processed by the video reception unit 310 may be stored and managed in the database 150.

The sound extraction unit 330 may separate sound data from video data. The sound extraction unit 330 may extract sound from video data using commercial software; if necessary, the sound extraction unit 330 may utilize a method that records video sound through playback of the video data and subsequently removes the sound from the video data. The sound extraction unit 330 may separate video data and sound data through various methods, and the separated video and sound data may be stored and managed in the database 150.

In one embodiment, the sound extraction unit 330 may apply at least one of a plurality of preprocessing methods to sound data. In other words, predetermined preprocessing steps may be applied to the sound data to make it suitable for data processing. In particular, the preprocessing operation may employ various methods and may be performed in various ways according to a single method or a combination of a plurality of methods. For example, the sound extraction unit 330 may perform preprocessing operations such as transforming one-dimensional sound data into a two-dimensional spectrogram, applying the absolute function to the two-dimensional spectrogram, and normalizing the absolute values based on the maximum value of the absolute values.

Here, spectrogram may correspond to a method of visualizing the spectrum of sound, expressed in the form of a graph. More specifically, the two-dimensional spectrogram corresponding to one-dimensional sound data provides a representation obtained by combining a waveform that visually expresses the change in the amplitude over time and a spectrum that visually expresses the change in the amplitude over frequency. For example, a two-dimensional spectrogram may correspond to a graph that expresses differences in amplitudes along the time and frequency axes as variations in color and intensity values.

The background sound separation unit 350 may extract background sound data from sound data. Here, background sound data may correspond to the result obtained by removing human voice from the sound data. The background sound separation unit 350 may remove only predetermined target sound information from the sound data using a learning model.

In one embodiment, the background sound separation unit 350 may define a machine learning-based network model including a deep neural network, construct a first network model that receives sound data as input and generates voice data as output, construct a second network model that receives sound data as input and generates background sound data as output, and separate voice data and background sound data respectively from the sound data based on the first and second network models. In other words, the background sound separation unit 350 may independently extract voice and background sound separately from sound data through a machine learning-based network model. To this end, the background sound separation unit 350 may independently construct a network model tailored to the specific sound to be extracted.

More specifically, the background sound separation unit 350 may construct a first network model for extracting voice data from sound data and a second network model for extracting background sound data from the sound data based on a predefined network model, respectively. For example, the first and second network models may be implemented through a deep neural network composed of a plurality of neural network-based encoders and decoders. Once the network model is constructed, the background sound separation unit 350 may extract voice and background sound by sequentially applying the first and second network models to the sound data to be separated. The extracted voice and background sound may be temporarily stored in the memory 230, and the background sound separator 350 may store only the background sound in the database 150 and delete the voice, without separate storage, to prevent the leakage of personal information.

In one embodiment, the background sound separation unit 350 may construct a third network model that receives voice data as input and generates a voice feature vector as output, perform irreversible encoding on the voice data based on the third network model, and store the voice feature vector generated through the irreversible encoding as learning data. Voice features may be defined as values of a predetermined length with a consistent data format (e.g., 16-bit integer or 32-bit floating point type) at specified time intervals within voice information and may be mathematically expressed as vectors. In other words, the background sound separation unit 350 may generate a voice feature vector as feature information corresponding to voice data and construct a dedicated network model for the voice feature vectors.

In particular, the third network model may generate a voice feature vector corresponding to voice data; in this case, the process of generating a voice feature vector through the third network model may correspond to an irreversible encoding process that prevents the restoration of the voice feature vector to the voice data through decoding. Meanwhile, voice feature vectors may not be used to identify an individual but for calculating similarity between voices, and based on the similarity, it may be determined whether voice data originates from the same speaker.

In one embodiment, the background sound separation unit 350 may construct a fourth network model that receives voice data as input and generates text data as output and extract text data from the voice data based on the fourth network model. In other words, voice data may be converted to text data through the fourth network model, which is a machine learning model, and the fourth network model may be constructed based on various voice recognition algorithms that convert voice into text. For example, voice recognition algorithms may include methods employing Hidden Markov Model (HMM), Dynamic Time Warping (DTW), and neural networks.

In one embodiment, the background sound separation unit 350 may detect personal information in text data, convert the personal information in the text data into anonymous information, and store the text data including the anonymous information as learning data. In other words, in the process of converting voice data to text data, characteristic information allowing identification of an individual, such as intonation or tone unique to the voice may be removed, and information closely related to personal information contained in the text may be removed or transformed into anonymous information that prevents the identification of an individual, through which the possibility of personal identification through the text may be eliminated. Meanwhile, the background sound separation unit 350 may employ a machine learning model for recognizing personal information to detect personal information from text data.

In one embodiment, the background sound separation unit 350 may replace personal information with a higher class name based on a machine learning-based transformation model. The higher class name of personal information within the text may be used as anonymous information that prevents the identification of an individual; however, the present disclosure is not necessarily limited to the specific example, and various names that ensure anonymity may be used. At this time, a transformation model constructed through machine learning may be used, and the transformation model may receive specific personal information as input and generate a higher class name of the corresponding personal information as output. For example, in the case of related information such as a person's name, height, age, or weight, the information may be replaced with a class name such as 'human' or 'person'; in the case of related information such as a specific address, location, building, or region, the information may be replaced with a class name such as 'site' or 'place.'

In one embodiment, the background sound separation unit 350 may replace personal information included in the text with anonymous information generated based on the voice feature vector. Here, anonymous information may correspond to random information generated using the voice feature vector. For example, the background sound separation unit 350 may apply a predetermined hash function to the voice feature vector generated through irreversible encoding and generate anonymous information based on a hash value. A hash table may be used to apply a hash function, and a conversion table independent of the hash table may be additionally used to generate anonymous information for the hash value.

In another example, the background separation unit 350 may generate a secret key for the encryption process based on the voice feature vector and perform encryption operations for encrypting personal information using the corresponding secret key. At this time, irreversible encoding may be applied according to the encryption algorithm used for the encryption operation, and transformation of personal information in the text to anonymous information may be achieved indirectly through the irreversible encoding.

The learning data storage unit 370 may store video data from which sound data has been removed and background sound data as learning data. Sound information without personal information may be used as learning data together with video information to improve the recognition performance of a machine learning model, and if sound information does not contain personal information, the sound information may also be applied to real-world service use cases without constraints. The learning data storage unit 370 may store and manage learning data from which personal information has been removed in the database 150 and store the learning data independently depending on the data type. One piece of video data stored in the database 150 may be linked to background sound data, voice feature vector, and text data without personal information, respectively, and a search operation within the database 150 may be performed using the voice feature vector as a unique key value. In other words, anonymous record data may be searched and extracted based on the similarity between voice feature vectors.

The controller 390 may control the overall operation of the apparatus 130 for constructing a learning database and manage a control flow or a data flow among the video reception unit 310, the sound extraction unit 330, the background sound separation unit 350, and the learning data storage unit 370.

Figure 4:
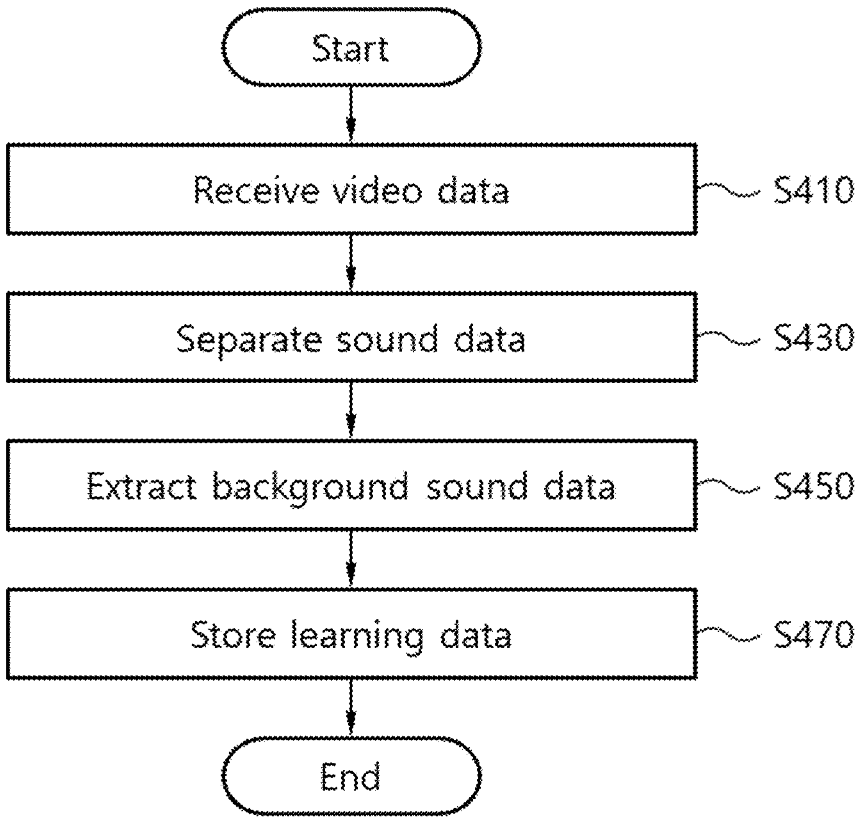
FIG. 4 is a flow diagram illustrating a method for constructing a learning database using a voice personal information protection technology according to the present disclosure.

FIG. 4 is a flow diagram illustrating a method for constructing a learning database using a voice personal information protection technology according to the present disclosure.

Referring to FIG. 4, the apparatus 130 for constructing a learning database may receive video data including sound data through the video reception unit 310 (S410). In one embodiment, the video reception unit 310 may separately receive sound data and video data corresponding to the sound data. In other words, the video data may correspond to video data without sound data. If video data including sound data is received, the video data may be passed to the sound extraction unit 330, and a predetermined separation process may be performed on the video data.

The apparatus 130 for constructing a learning database may separate sound data from video data through the sound extraction unit 330 (S430). The video data may include various sounds; for example, video data captured by a black box installed in a vehicle may include engine sounds generated while the vehicle is driving, conversations between a driver and passengers inside the vehicle, and external sounds coming from the surroundings of the vehicle.

Also, the sound data extracted from the video data may undergo a predetermined preprocessing step. For example, the sound extraction unit 330 may perform a preprocessing operation that transforms the sound data into a two-dimensional spectrogram, which may involve adjusting the range of the spectrogram or applying predetermined filters to the spectrogram for subsequent operation steps.

Also, the apparatus 130 for constructing a learning database may extract background sound data from sound data through the background sound separation unit 350 (S450). A pre-constructed learning network may be used for the separation process of sound data, and a learning network model may be constructed in advance based on various machine learning-based network models. In one embodiment, the background sound separation unit 350 may extract background sound data separately for each sound type from the sound data. For example, the background sound separation unit 350 may distinguish and extract sounds inside and outside the vehicle from the sound data and may also extract sounds separately for the driver and passenger (or for each user). In other words, the background sound separation unit 350 may independently extract sound data according to its sound type; in this case, sound type information related to the extracted sound data may be defined in advance and utilized in the corresponding process.

Also, the apparatus 130 for constructing a learning database may store video data from which sound data has been removed and background sound data as learning data through the learning data storage unit 370 (S470). In one embodiment, the learning data storage unit 370 may bundle information extracted or generated in relation with one video data as a single learning data unit and store the bundled information in the database 150. For example, one learning data unit may include video data, background sound data extracted from sound data, voice feature vectors generated based on voice data, and text data from which personal information has been removed. In another embodiment, the learning data storage unit 370 may generate an identification code related to the corresponding learning data based on the voice feature vector of specific learning data and store the generated identification code together with the learning data.

Figure 5:
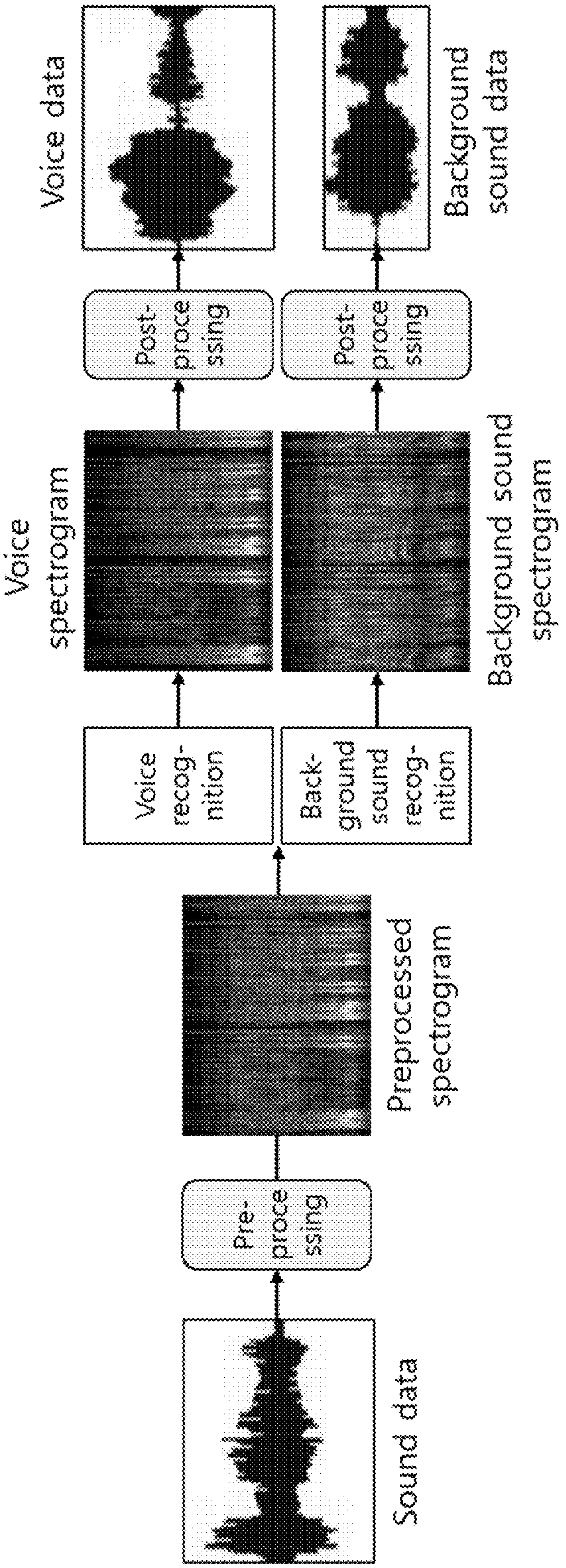
FIG. 5 illustrates one embodiment of a method for separating a voice from a background sound according to the present disclosure.

FIG. 5 illustrates one embodiment of a method for separating a voice from a background sound according to the present disclosure.

Referring to FIG. 5, the apparatus 130 for constructing a learning database may separate voice data from background sound data within sound data separated from video data or received separately from the video data by applying a preprocessing task and a machine learning model. For example, the apparatus 130 for constructing a learning database may generate a preprocessed spectrogram by preprocessing the sound data and extract a voice spectrogram and a background sound spectrogram from the generated preprocessed spectrogram. The extracted spectrograms may undergo postprocessing operations to be generated separately as voice data and background sound data. At this time, while the background sound data is stored as learning data in the database 150 without modification, voice data may undergo an additional operation for removing personal information.

Figure 6:
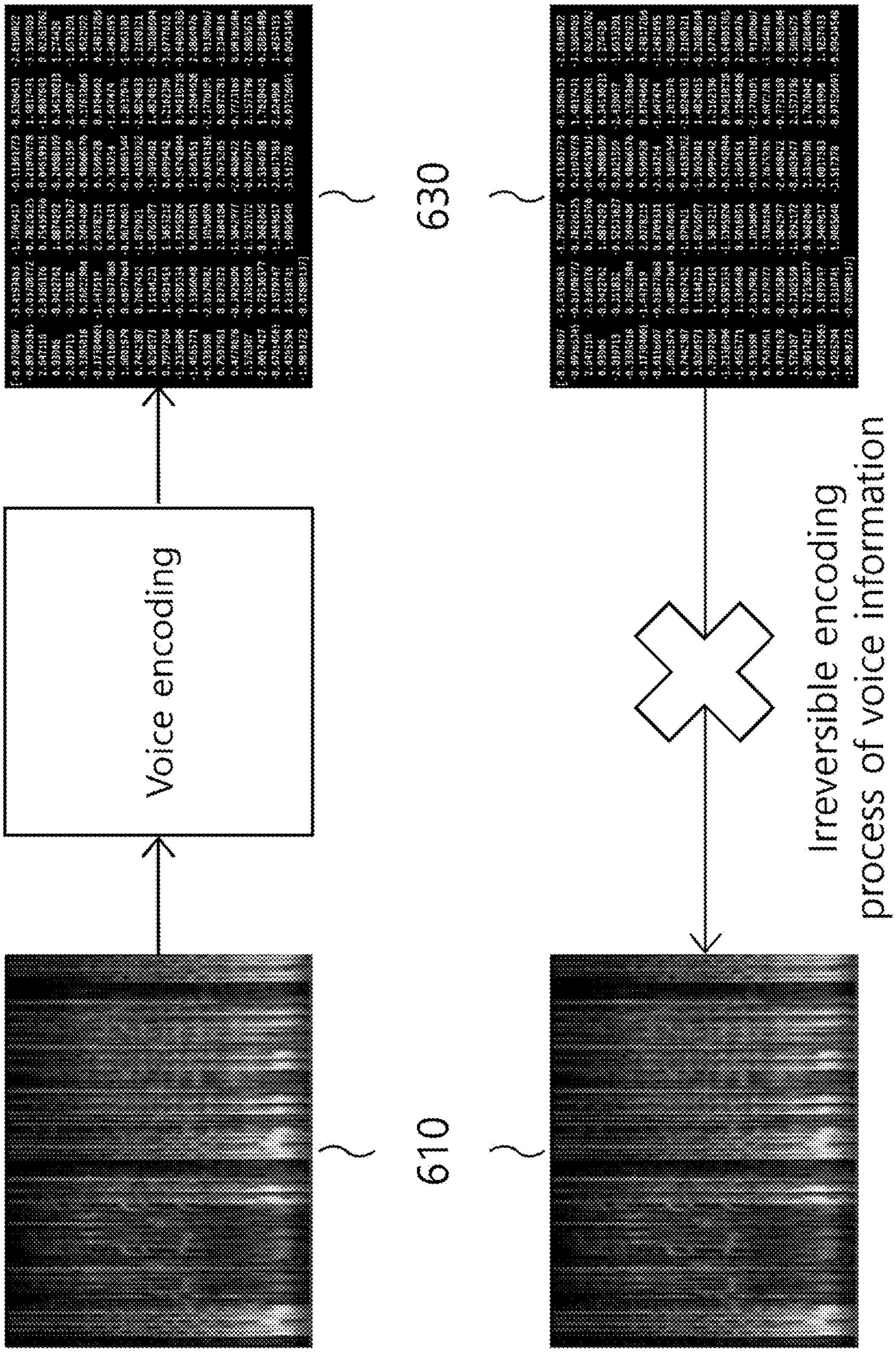
FIGS. 6 and 7 illustrates one embodiment of a method for calculating a feature vector according to the present disclosure and irreversible characteristics of the method.
Figure 7:
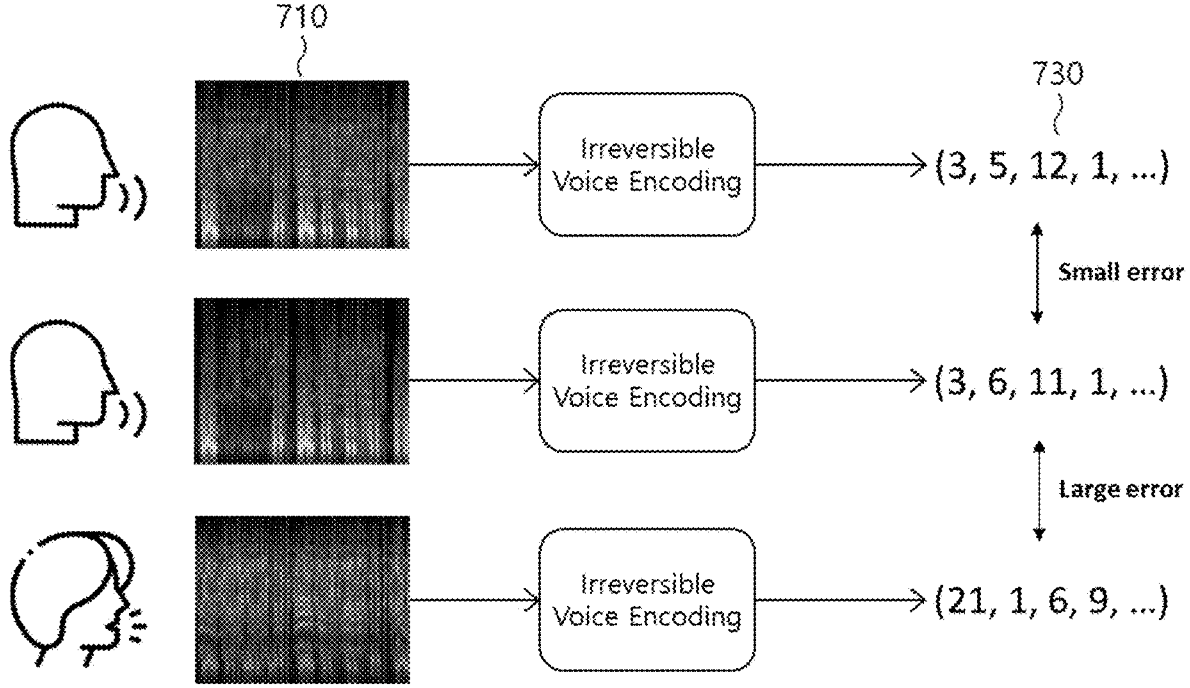

FIGS. 6 and 7 illustrates one embodiment of a method for calculating a feature vector according to the present disclosure and irreversible characteristics of the method.

Referring to FIG. 6, the apparatus 130 for constructing a learning database may encode voice data 610 through a machine learning model. At this time, an encoded voice feature vector 630 may not be restored to its original voice data 610. In other words, the voice encoding process for generating a voice feature vector 630 corresponding to the voice data 610 may correspond to an irreversible encoding process of voice information.

Referring to FIG. 7, the voice feature vector 730 generated through irreversible encoding of the voice data 710 may not be used for speaker identification; instead, the similarity between voice feature vectors 730 may be used to determine whether the speakers of two voices are the same person. As shown in FIG. 7, even if voices are recorded at different times and have different utterance contents, the voice feature vectors 730 of the same person may exhibit similarity, with only a small error existing between the voices. In contrast, voice feature vectors 730 from different individuals show low similarity, exhibiting a relatively large error between the voices.

In other words, the apparatus 130 for constructing a learning database may effectively retrieve the voice data 710 generated by the same person using the voice feature vector 730 from among the learning data constructed in the database 150. Also, the apparatus 130 for constructing a learning database may effectively determine whether the speakers of two unidentified voices are the same person based on the voice feature vector 730.

Figure 8:
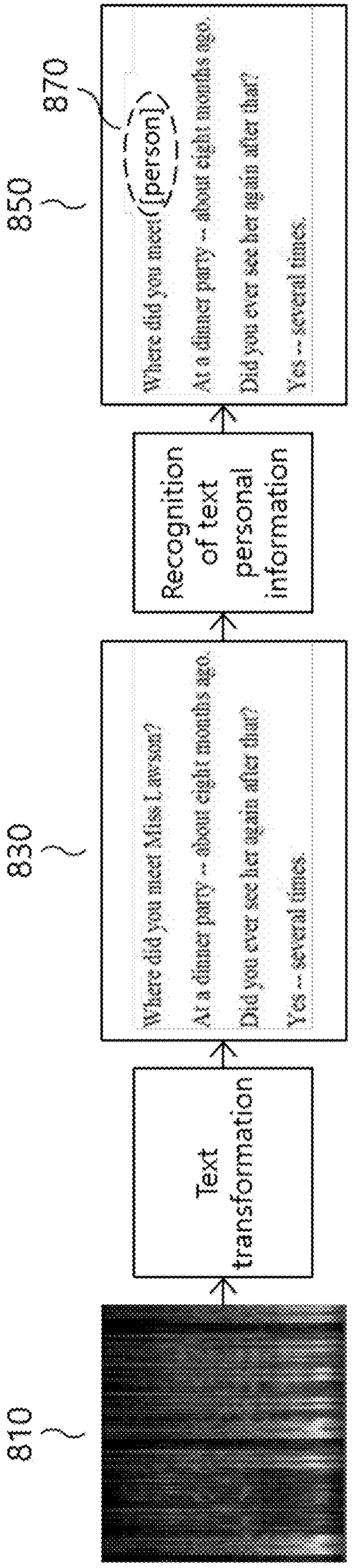
FIG. 8 illustrates one embodiment of a text transformation method according to the present disclosure.

FIG. 8 illustrates one embodiment of a text transformation method according to the present disclosure.

Referring to FIG. 8, the apparatus 130 for constructing a learning database may convert voice data 810 to text data 810 using a machine learning model. The apparatus 130 for constructing a learning database may effectively remove personal information within the text through a machine learning model for personal information recognition which recognizes personal information included in the text data 810 and information related to the personal information. Also, the apparatus 130 for constructing a learning database may simultaneously remove the personal information within the text and replace the personal information with anonymous information with anonymity. For example, the apparatus 130 for constructing a learning database may replace personal information within the text with a recognized higher class name 870 and may use a machine learning model while determining the higher class name 870 corresponding to the personal information. The text data 850 with personal information removed may be stored and managed in the database 150 as learning data related to the video information.

Figure 9:
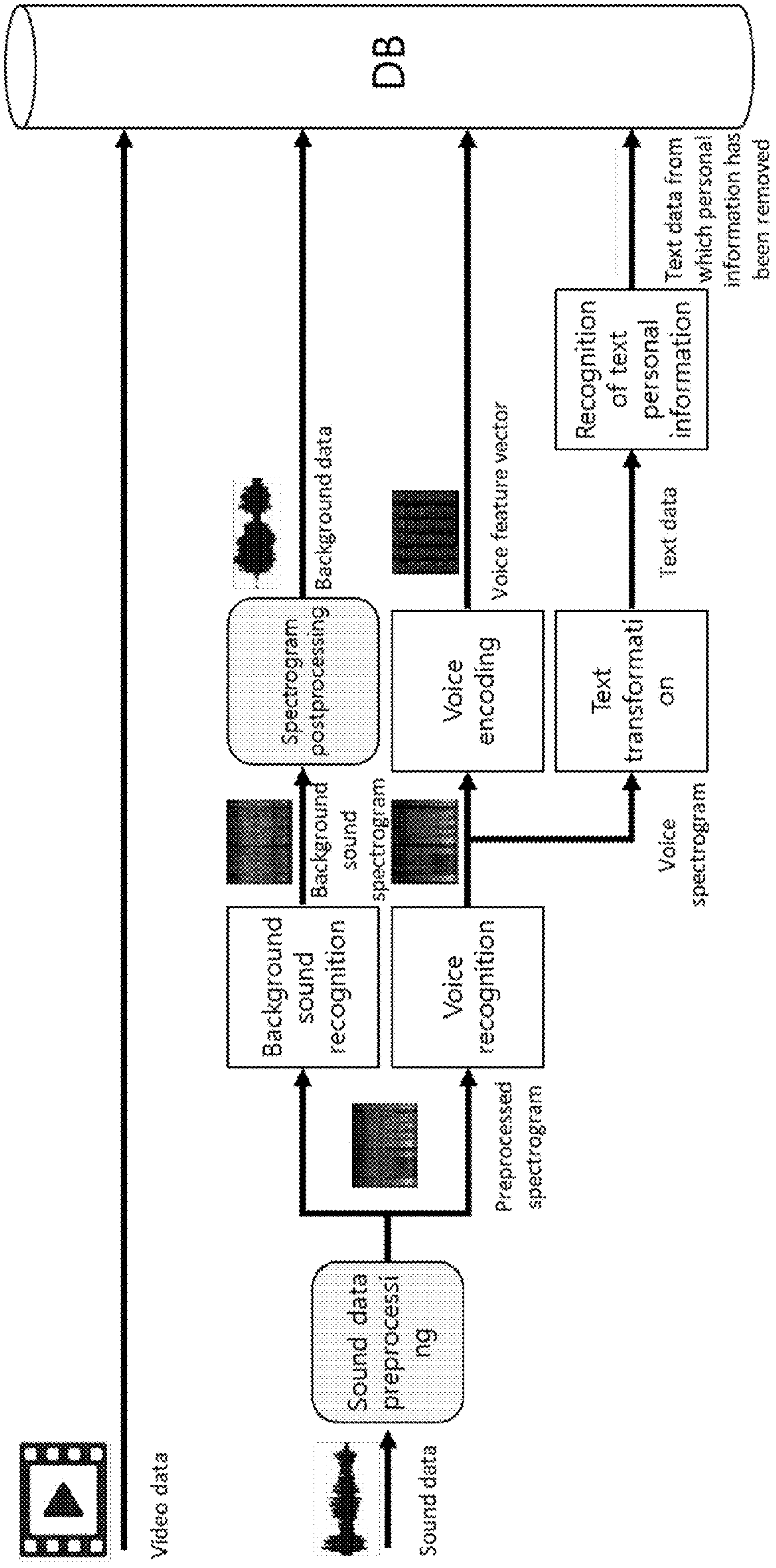
FIG. 9 illustrates the overall concept of the present disclosure.

FIG. 9 illustrates the overall concept of the present disclosure.

Referring to FIG. 9, the apparatus 130 for constructing a learning database may separate sound information into voice information and background sound information and store voice feature vectors, which is obtained by applying an irreversible and undecodable encoding method to the voice information, and text information along with video data to construct a machine learning database. The apparatus 130 for constructing a learning database may identify and extract anonymous record data based on the similarity between voice feature vectors from the constructed machine learning database.

Also, in a management case involving black box videos collected during the driving of a vehicle, the apparatus 130 for constructing a learning database may extract a driving record most similar to a voice feature vector calculated from the voice of a particular individual in response to the demands presented with a warrant from a law enforcement agency. Meanwhile, the driving records may have voice feature vectors of both the driver and passengers obtained during the driving of the vehicle.

The apparatus 130 for constructing a learning database according to the present disclosure may use data processing technology utilizing numerous parameters, called a deep learning or deep neural network, to separate sound data included in video data into a background sound and a human voice; the voice may be transformed into feature vectors and text, after which any identification information that may reveal an individual is removed. In other words, the apparatus 130 for constructing a learning database may effectively secure learning data in the form of video difficult to collect for machine learning and automatically remove personal information included in the voice data within the video, thereby protecting personal information.

Although the present disclosure has been described above with reference to preferred embodiments, it should be understood by those skilled in the art that various modifications and changes may be made to the present disclosure without departing from the idea and scope of the present disclosure as set forth in the following claims.

DESCRIPTION OF REFERENCE NUMERALS

100: System for constructing a learning database
110: User terminal 130: Apparatus for constructing a learning database
150: Database
210: Processor 230: Memory
250: User input/output unit 270: Network input/output unit
310: Video reception unit 330: Sound extraction unit
350: Background sound separation unit 370: Learning data storage unit
390: Controller

What is claimed is:

1. A method for constructing a learning database using a voice personal information protection technology, the method comprising:
receiving video data including sound data;
separating the sound data from the video data;
extracting background sound data from the sound data; and
storing the video data, from which the sound data has been removed, and the background sound data as learning data,
wherein the extracting of the background sound data includes:
defining a machine learning-based network model including a deep neural network;
constructing a first network model, receiving the sound data as input, and generating voice data as output;
constructing a second network model, receiving the sound data as input, and generating the background sound data as output;
separating the voice data and the background sound data from the sound data based on the first and second network models;
constructing a third network model, receiving the voice data as input, and generating a voice feature vector as output;
performing irreversible encoding to the voice data based on the third network model;
storing the voice feature vector generated by the irreversible encoding as the learning data, wherein the voice feature vector does not have information for identifying a speaker of the voice data, and the voice feature vector has information for determining whether speakers of two voices are the same person;
constructing a fourth network model, receiving the voice data as input, and generating text data as output;
extracting the text data from the voice data based on the fourth network model;
detecting personal information from the text data;
transforming the personal data from the text data into anonymous data; and
storing, in the learning database, the text data including the anonymous information as the learning data, and deleting, in the learning database, the voice data.

2. The method of claim 1, wherein the separating of the sound data includes applying at least one of a plurality of preprocessing methods to the sound data.

3. The method of claim 1, wherein the transforming of the personal data into the anonymous data includes replacing the personal information with a higher class name based on a machine learning-based transformation model.

4. A system for constructing a learning database using a voice personal information protection technology, the system comprising:
a processor configured to:
receive video data including sound data;
separate the sound data from the video data;
extract background sound data from the sound data; and
store the video data, from which the sound data has been removed, and the background sound data as learning data,
wherein the processor is further configured to:
define a machine learning-based network model including a deep neural network;
construct a first network model, receiving the sound data as input, and generating voice data as output;
construct a second network model, receiving the sound data as input, and generating the background sound data as output;
separate the voice data and the background sound data from the sound data based on the first and second network models;
construct a third network model, receiving the voice data as input, and generating a voice feature vector as output;
perform irreversible encoding to the voice data based on the third network model;
store the voice feature vector generated by the irreversible encoding as the learning data, wherein the voice feature vector does not have information for identifying a speaker of the voice data, and the voice feature vector has information for determining whether speakers of two voices are the same person;
construct a fourth network model, receiving the voice data as input, and generating text data as output;
extract the text data from the voice data based on the fourth network model;
detect personal information from the text data;
transform the personal data from the text data into anonymous data; and
store, in the learning database, the text data including the anonymous information as the learning data, and delete, in the learning database, the voice data.

* * * * *